(12) United States Patent
Zhou et al.

(10) Patent No.: US 11,947,598 B2
(45) Date of Patent: Apr. 2, 2024

(54) METHOD, APPARATUS AND COMPUTER PROGRAM FOR GENERATING SEARCH RESULTS

(71) Applicant: Microsoft Technology Licensing, LLC, Redmond, WA (US)

(72) Inventors: Ning Zhou, Oslo (NO); Aleksander Øhrn, Oslo (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/775,917

(22) PCT Filed: Nov. 6, 2020

(86) PCT No.: PCT/US2020/059251
§ 371 (c)(1),
(2) Date: May 11, 2022

(87) PCT Pub. No.: WO2021/101727
PCT Pub. Date: May 27, 2021

(65) Prior Publication Data
US 2023/0004599 A1    Jan. 5, 2023

(30) Foreign Application Priority Data
Nov. 19, 2019   (EP) .................................... 19210182

(51) Int. Cl.
*G06F 16/901*  (2019.01)
*G06F 16/903*  (2019.01)
*G06F 16/906*  (2019.01)
(52) U.S. Cl.
CPC .... *G06F 16/9024* (2019.01); *G06F 16/90335* (2019.01); *G06F 16/906* (2019.01)

(58) Field of Classification Search
None
See application file for complete search history.

(56) References Cited

U.S. PATENT DOCUMENTS 7,512,612 B1 * 3/2009 Akella ................... H04L 51/52
8,370,313 B2 * 2/2013 Snow .................... G06F 16/951
707/694

(Continued)

FOREIGN PATENT DOCUMENTS

EP    3113042 A1    1/2017

OTHER PUBLICATIONS

McNally, Kevin, Michael P. O'Mahony, and Barry Smyth. "A comparative study of collaboration-based reputation models for social recommender systems." User Modeling and User-Adapted Interaction 24 (2014): 219-260. (Year: 2014).*

(Continued)

*Primary Examiner* — Uyen T Le
(74) *Attorney, Agent, or Firm* — Barta Jones, PLLC

(57) ABSTRACT

A search query relating to a search for people and including one or more search terms is received. A search graph for the search is created from a previously created graph which is a directional graph in which people are represented by nodes and content is represented by nodes or edges. The search graph is generated by filtering out nodes or edges that represent content that is determined not to be relevant to the search terms in the search query; and, for the remaining content that is determined to be relevant to the search terms in the search query, adding to the graph a measure of the relevance of the content to the search terms. The search results are generated by operating on the search graph to identify people in the search graph who are sources of content that is relevant to the search terms.

20 Claims, 5 Drawing Sheets

(56) References Cited

U.S. PATENT DOCUMENTS

| | | | | |
|---|---|---|---|---|
| 8,566,262 | B2* | 10/2013 | Deyo | G06Q 10/10 706/12 |
| 8,775,517 | B1* | 7/2014 | Goldman | H04L 12/1813 709/204 |
| 9,015,171 | B2* | 4/2015 | Bayliss | G06Q 10/10 707/739 |
| 9,244,985 | B1 | 1/2016 | Haugen et al. | |
| 10,176,232 | B2 | 1/2019 | Coll et al. | |
| 2012/0078906 | A1* | 3/2012 | Anand | G06Q 10/105 707/E17.089 |
| 2012/0096002 | A1* | 4/2012 | Sheehan | G06Q 50/01 707/E17.046 |
| 2015/0026120 | A1* | 1/2015 | Chrapko | G06F 16/9024 707/748 |
| 2015/0120717 | A1 | 4/2015 | Padmanabhan et al. | |
| 2016/0117413 | A1* | 4/2016 | Botea | G06F 16/28 707/749 |
| 2016/0335367 | A1 | 11/2016 | Wang et al. | |
| 2017/0316098 | A1 | 11/2017 | Meyerzon et al. | |

OTHER PUBLICATIONS

Rafiei, Majid, and Ahmad A. Kardan. "A novel method for expert finding in online communities based on concept map and PageRank." Human-centric computing and information sciences 5 (2015): 1-18. (Year: 2015).*

"Graph API Reference", Retrieved from: https://web.archive.org/web/20190724210541/https:/developers.facebook.com/docs/workplace/integrations/custom-integrations/reference/, Jul. 24, 2019, 8 Pages.

"Office 365 Personalized Search Leverages Office Graph", Retrieved from: https://www.crowcanyon.com/blogs/office-365-personalized-search/, Sep. 6, 2017, 6 Pages.

"Extended Search Report Issued in European Patent Application No. 19210182.2", dated Mar. 19, 2020, 8 Pages.

Carmel, et al., "Personalized Social Search Based on the User's Social Network", In Proceedings of the 18th ACM Conference on Information and Knowledge Management, Nov. 2, 2009, 10 Pages.

Graham, et al., "Use the People API in Microsoft Graph to get Information about the People most Relevant to you", Retrieved From: https://docs.microsoft.com/en-us/graph/people-example, Nov. 4, 2021, 20 Pages.

Hamilton, et al., "Inductive Representation Learning on Large Graphs", In Proceeding of the 31st Conference on Neural Information Processing Systems, Dec. 4, 2017, 11 Pages.

He, et al., "Building the LinkedIn Knowledge Graph", Retrieved from: https://engineering.linkedin.com/blog/2016/10/building-the-linkedin-knowledge-graph, Oct. 6, 2016, 11 Pages.

Kleinberg, et al., "The Web as a Graph: Measurements, Models, and Methods", In International Computing and Combinatorics Conference, Jul. 26, 1999, 18 Pages.

Wu, et al., "A Comprehensive Survey on Graph Neural Networks", In Journal of Latex Class Files, Aug. 8, 2019, 22 Pages.

Page, et al., "The PageRank Citation Ranking: Bringing Order to the Web", In Technical Report of Stanford InfoLab, Jan. 29, 1998, 17 Pages.

"International Search Report and Written Opinion Issued in PCT Application No. PCT/US20/059251", dated Jan. 25, 2021, 13 Pages.

Perozzi, et al., "DeepWalk: Online Learning of Social Representations", In Proceedings of the 20th ACM SIGKDD International Conference on Knowledge Discovery and Data Mining, Aug. 24, 2014, pp. 701-710.

Ramos, Juan, "Using TF-IDF to Determine Word Relevance in Document Queries", In Proceedings of the First Instructional Conference on Machine Learning, vol. 242, Issue 1, Dec. 3, 2003, 4 Pages.

Robertson, et al., "The Probabilistic Relevance Framework: BM25 and Beyond", In Journal of Foundations and Trends in Information Retrieval, vol. 03, Issue 4, Dec. 17, 2009, pp. 333-389.

Shah, Hiten, "How Slack Became an $16 Billion Business by Making Work Less Boring", Retrieved from https://web.archive.org/web/20190731201415/https:/usefyi.com/slack-history/, Jul. 31, 2019, 40 Pages.

Stocky, et al., "Introducing Graph Search Beta", Retrieved from: https://about.fb.com//news/2013/01/introducing-graph-search-beta/, Jan. 15, 2013, 8 Pages.

* cited by examiner

METHOD, APPARATUS AND COMPUTER PROGRAM FOR GENERATING SEARCH RESULTS

TECHNICAL FIELD

The present disclosure relates to a method, apparatus and computer program for generating search results.

BACKGROUND

People often want to identify other people who are skilled in a particular area or field, so that for example they can be contacted for support or assistance or the like, so that publications by them can be easily followed, etc. This is often the case for a search amongst other workers within an enterprise or organisation, such as a large company, charity organisation, etc. However, given the often large amount of data involved, especially when searching across a large number of people, it can currently be difficult or even practically impossible to carry out an effective search that is contextualised (in the sense that the search is relevant to the searcher and/or the search query) and in or close to real time (in the sense that the search results can be returned quickly, such as within a few seconds).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to a first aspect disclosed herein, there is provided a method carried out by a computing device to generate search results relating to a search for people, the method comprising the computing device:
- receiving from a user a search query, the search query relating to a search for people and including one or more search terms;
- in response to receiving the search query, generating a search graph for the search, wherein the search graph is generated from a previously created graph;
- wherein the previously created graph is a directional graph representing people and content shared between people, the previously created graph comprising nodes and edges between the nodes, with people being represented by nodes of the graph and with content being represented by nodes of the graph or edges of the graph, the direction of the edges of the graph indicating whether a person is a source or a destination of the corresponding content;
- wherein generating the search graph comprises: generating the search graph from the previously created graph by filtering out nodes or edges of the previously created graph that represent content that is determined not to be relevant to the one or more search terms in the search query; and, for the remaining content that is determined to be relevant to the one or more search terms in the search query, adding to the graph a measure of the relevance of the content to the one or more search terms in the search query; and
- generating the search results by operating on the search graph to identify people in the search graph who are sources of content that is relevant to the one or more search terms in the search query.

Because the search graph for the search by the first user is generated in response to receiving the search query, the graph is dynamically created. Further, in examples, not only is the relevance of the content a person produced taken into account in the search, but also the "popularity" or "influence" of the content can be taken into account, by for example checking how many readers/receivers there are per each content piece.

A "source" of an item of content is the person who is the source of the content. The source may therefore be the person who sent an email or chat message, sent an (electronic) meeting invitation, posted a document on an intranet, etc., in each case where the email or chat message, invitation, document, etc. contains the content. That person will often also have created the content and therefore will also be the "author" of the content.

A "destination" of an item of content is the person who is a target or sink or consumer or receiver of the content. The person may therefore be the person who received an email or chat message, received an (electronic) meeting invitation, read a document on an intranet, etc., in each case where the email or chat message, invitation, document, etc. contains the content. That person will typically have not created the content.

According to a second aspect disclosed herein, there is provided a computer program comprising instructions such that when the computer program is executed on one or more computing devices, the one or more computing devices are arranged to carry out a method of generating search results relating to a search for people, the method comprising the one or more computing devices:
- receiving from a user a search query, the search query relating to a search for people and including one or more search terms;
- in response to receiving the search query, generating a search graph for the search, wherein the search graph is generated from a previously created graph;
- wherein the previously created graph is a directional graph representing people and content shared between people, the previously created graph comprising nodes and edges between the nodes, with people being represented by nodes of the graph and with content being represented by nodes of the graph or edges of the graph, the direction of the edges of the graph indicating whether a person is a source or a destination of the corresponding content;
- wherein generating the search graph comprises: generating the search graph from the previously created graph by filtering out nodes or edges of the previously created graph that represent content that is determined not to be relevant to the one or more search terms in the search query; and, for the remaining content that is determined to be relevant to the one or more search terms in the search query, adding to the graph a measure of the relevance of the content to the one or more search terms in the search query; and
- generating the search results by operating on the search graph to identify people in the search graph who are sources of content that is relevant to the one or more search terms in the search query.

There may be provided a non-transitory computer-readable storage medium storing a computer program as described above.

According to a third aspect disclosed herein, there is provided apparatus comprising a processing system constructed and arranged to carry out a method of generating search results relating to a search for people, the method comprising:

receiving from a user a search query, the search query relating to a search for people and including one or more search terms;

in response to receiving the search query, generating a search graph for the search, wherein the search graph is generated from a previously created graph;

wherein the previously created graph is a directional graph representing people and content shared between people, the previously created graph comprising nodes and edges between the nodes, with people being represented by nodes of the graph and with content being represented by nodes of the graph or edges of the graph, the direction of the edges of the graph indicating whether a person is a source or a destination of the corresponding content;

wherein generating the search graph comprises: generating the search graph from the previously created graph by filtering out nodes or edges of the previously created graph that represent content that is determined not to be relevant to the one or more search terms in the search query; and, for the remaining content that is determined to be relevant to the one or more search terms in the search query, adding to the graph a measure of the relevance of the content to the one or more search terms in the search query; and generating the search results by operating on the search graph to identify people in the search graph who are sources of content that is relevant to the one or more search terms in the search query.

The processing system may comprise at least one processor and at least one memory including computer program instructions, the at least one memory and the computer program instructions being configured, with the at least one processor, to cause the apparatus to operate as described above.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
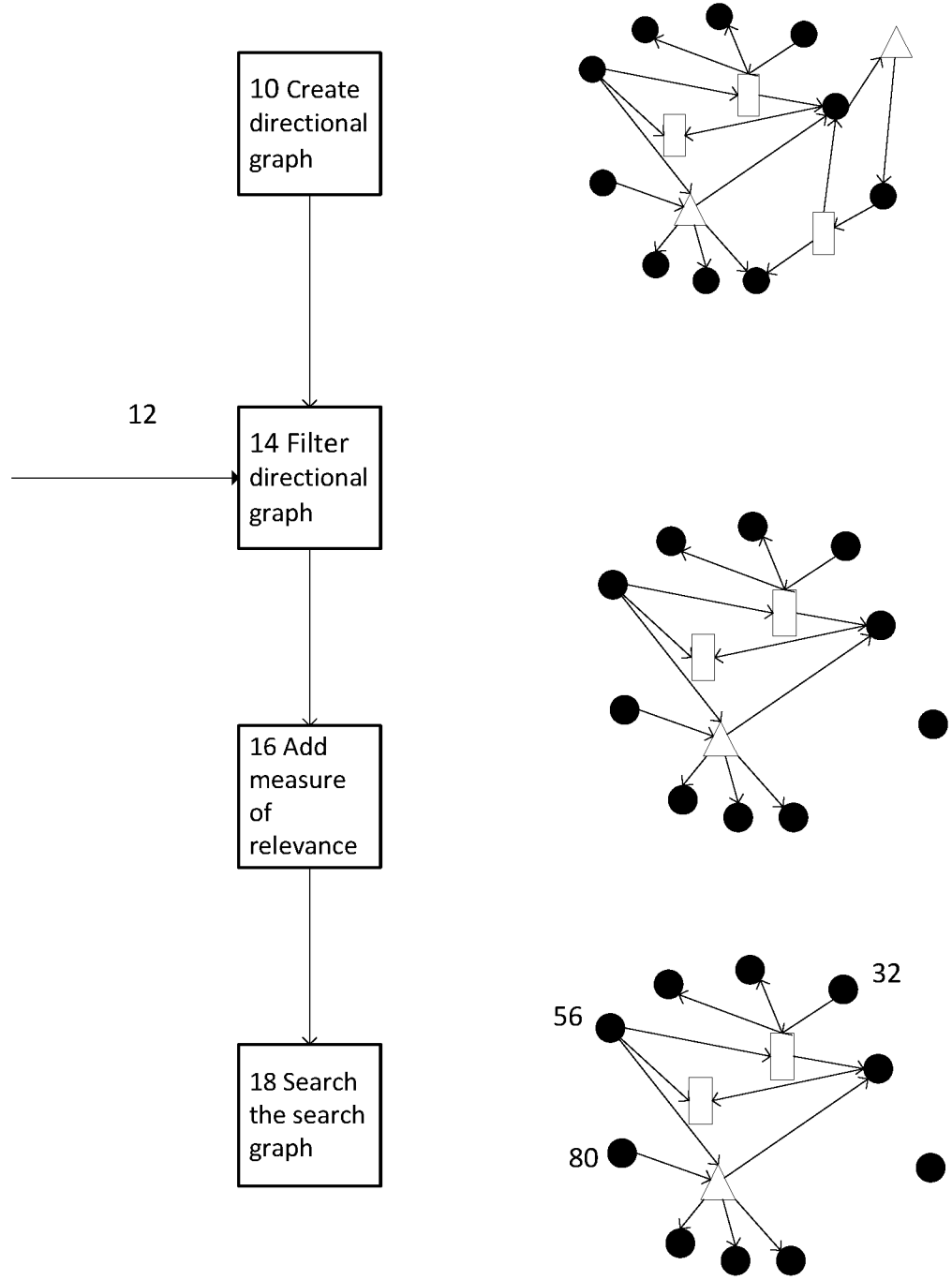
FIG. 1 shows schematically an overview of four main stages involved in an example of the present disclosure.

As mentioned, people often want to identify other people who are skilled or active in a particular area or field, so that for example they can be contacted for support or assistance or the like, so that publications by them can be easily followed, etc. This may for example be the case for a search amongst other workers within an enterprise or organisation, such as a large company, charity organisation, government department, etc. People who are skilled or active in a particular area or field may be referred to as "influencers".

Existing (computerised) people searches tend only to look at the people themselves, and only look at information that is explicit in people's computer profiles (such as department name, job title, groups joined, interests listed by the person in their profile, etc.). However, this pays little or no regard to any specific subject matter of interest to the searcher, and so the search results may return people who have little or no interest or skill in that subject matter.

Further, given the often large amount of data involved, especially when searching across a large number of people, it can currently be difficult or even practically impossible to carry out an effective people search that is contextualised (in the sense that the search is relevant to the searcher's specific search query) and in or close to real time (in the sense that the search results can be returned quickly, such as within a few seconds).

According to an example described herein, a method carried out by a computing device to generate search results relating to a search for people comprises the computing device:

receiving from a user a search query, the search query relating to a search for people and including one or more search terms;

in response to receiving the search query, generating a search graph for the search, wherein the search graph is generated from a previously created graph;

wherein the previously created graph is a directional graph representing people and content shared between people, the previously created graph comprising nodes and edges between the nodes, with people being represented by nodes of the graph and with content being represented by nodes of the graph or edges of the graph, the direction of the edges of the graph indicating whether a person is a source or a destination of the corresponding content;

wherein generating the search graph comprises: generating the search graph from the previously created graph by filtering out nodes or edges of the previously created graph that represent content that is determined not to be relevant to the one or more search terms in the search query; and, for the remaining content that is determined to be relevant to the one or more search terms in the search query, adding to the graph a measure of the relevance of the content to the one or more search terms in the search query; and generating the search results by operating on the search graph to identify people in the search graph who are sources of content that is relevant to the one or more search terms in the search query.

In an example, the method is carried out jointly for content that is public content and content that is private content.

In an example, the method is carried out separately for content that is public content and for content that is private content, wherein generating the search results comprises combining the results of operating on the search graphs for the public content and the private content.

In an example, the private search graph of each person does not include a node representing that person.

Such a private search graph therefore also does not have any edges linked to that person.

In an example, the previously created graph is created such that people are represented by nodes of the graph, content is represented by nodes of the graph, edges from a person node to a content node indicate that the person sent the content, and edges from a content node to a person node indicate that the person received the content.

In an example, at least the search graph for the search by the user is created such that people are represented by nodes of the graph, content is represented by edges of the graph, and the direction of an edge between two persons indicates the direction in which the content was sent by a source person to a destination person.

In an example, the method comprises generating a sub-graph by generating a neighbourhood graph for each person, in which the graph for each person comprises only contents that are produced by that user and people who are readers or recipients of those contents.

In an example, operating on the search graph to identify people in the search graph who are sources of content that is relevant to the one or more search terms in the search query comprises, for each person's sub-graph, classifying the person nodes based on only any immediate neighbour person nodes and not utilizing information from any more remote person nodes.

In an example, the person nodes are classified with a graph classifier which is trained with external data.

In an example, the relevance of content to the one or more search terms in the search query is determined by applying a relevance model to the search graph.

In an example, operating on the search graph to identify people in the search graph who are sources of content that is relevant to the one or more search terms in the search query comprises applying a graph classification technique to each people node in the search graph.

Referring to FIG. 1, this shows schematically an overview of four main stages involved in an example of the present disclosure. This may be carried out by one or more processors of one or more computing devices in accordance with instructions provided by one or more computer programs running on the one or more computing devices. FIG. 1 also schematically shows to the right hand side examples of the corresponding graph produced at each stage. In the graphs, the filled circles are the nodes that represent people; rectangles are the nodes that represent (proper) documents, like Microsoft Word documents, etc.; and triangles are the nodes that represent Web (including for example Intranet) pages. It is to be understood that the graphs are shown highly schematically and that, in practice, there may be many more people nodes and content nodes than shown in this simplified example.

At 10, a directional graph representing people and content shared between people is created. In an example, the edges between nodes of the directional graph represent at least the relevance or importance of the content to the people represented by the respective nodes. At 12, a search query is received and the graph is filtered 14 depending on the relevance of the contents in the graph to the query. Simply put, this removes content from the initial directional graph that is not relevant to the query (such that content nodes for content that is not relevant are removed from the graph). For the remaining content, i.e., the content that is determined to be relevant to the query, a measure of the relevance of the content to the one or more search terms in the search query is added at 16 to the relevant edges (the measure of the relevance not being shown in the schematic graphs in the drawings). This in essence forms what may be called a "search graph", which can then be efficiently and quickly searched at 18 to identify people in the search graph who are sources of content that is relevant to the one or more search terms in the search query. This may use for example a node classifier which is applied to each person node to determine whether or not the person can be regarded as an "influencer". In the graph to the right hand side of item 18 in FIG. 1, a score ("56", "32" and "80") for each of the identified influencers is indicated (which is omitted from the other similar graphs in the other figures for reasons of clarity). Examples and variations of each of these stages will be discussed in more detail below. Further, this may be carried out effectively jointly for content that is deemed to be public and content that is deemed to be private, with both public and private content being represented in the original directional graph and the search graph, and so provide search results relating to public and private content immediately. Alternatively, this may be carried out separately for public content and for private content, using separate original directional graphs and separate search graphs for public content and for private content, and the respective separate results for public and private content can then be merged in an appropriate manner to provide the search results. Again, examples of this will be discussed in more detail below.

The present techniques enable a user to search for other people who somehow are known or connected to the user (as each person who is searched is likely to be in or related to the same enterprise or organisation or group of companies, etc.) and who are likely to have an interest in or even be an expert in the topic of interest to the user (as revealed by the search terms provided by the user). Notably, such a search is carried out dynamically in that the search graph is generated in response to the search query being received and then the search results are generated. Amongst other things, this ensures that the search results are up to date. The search is also personalised in that it favours finding people who are (somehow) known or connected to the user. Also, the search is contextualised in that it not only looks for people who are known to the user but also looks for such people who have an interest or, in particular, are experts in the topic of interest to the user. In examples, this is based on the content that people produce (rather than for example indications of "interests" that people may have indicated in a computer profile or the like), and can take into account both the relevance of the content to the subject of the search and the popularity of the content in a contextualized way.

Examples of search methods in accordance with the present disclosure will now be described in detail.

As mentioned with reference to FIG. 1, an initial directional graph representing people and content shared between the people is created at 10. The generation of the directional graph may be carried out as a preliminary stage, prior to a search query being received and processed. Nevertheless, the directional graph may be updated, either from time to time or on a substantially continuous basis, as new content is shared between people and/or new people are added.

A detailed example of generation of the directional graph will be given with reference to the schematic flow chart shown in FIG. 2. In this example, nodes of the graph represent people and (other) nodes of the graph represent content shared between people. The direction of the edges of the graph indicate whether a person is a source (or sender) or a destination (or recipient) of the corresponding content (it being understood that, in general, a sender of some specific content may or may not also be an author of that content).

For each person to be represented by the graph, a node of the graph is generated at 20. In an example, the people who are to be represented by the nodes of the graph are all somehow related. As a particular example of interest, this is all people who are part of some enterprise or organisation, such as a large company, charity organisation, one or more government departments, etc. The generation of the nodes for each person may be carried out automatically by referring to and using one or more identifiers of the people. The identifier may be for example an email address or alias for the person in the enterprise. Such email addresses or aliases or the like may be held in some computer records for or at the enterprise and so can easily be searched by a computer to obtain the identifiers and therefore enable the corresponding people nodes to be generated.

Next, at 22, nodes for the content to be represented by the directional graph are generated. The details of how this is carried out will often depend on the nature or source of the particular content. The content may for example be or be included in one or more emails sent from one or more persons to one or more other persons; one or more "chat" or "instant messaging" messages or the like sent from one or more persons to one or more other persons; (electronic) calendar or meeting invitations sent to one or more users; (electronic) documents made available to one or more users; etc. (For convenience and unless the context requires otherwise, the word "document" will often be used herein generically to include emails, messages, calendar or meeting invitations, etc. as well as conventional electronic documents, such as a Microsoft Word document, a Web page or HTML (hypertext mark-up language) document, etc.) Generating nodes of the graph for the content will therefore typically require that the documents be traversed by some crawler or similar software that pulls out the relevant content from the documents. Other relevant data can also be obtained from the documents for use in the graph.

To illustrate this by example in the particular case of emails, the email data includes not only the title (or "subject line") and body text of the emails, but also metadata such as sender, receiver, parent folder, flag status various timestamps, reading time (i.e., the amount of time a person spent reading the email) and so on. In an example, the following fields are extracted from the emails when generating the people nodes at 20 mentioned above:

(i) FromString: The email address of the sender.

(ii) ToRecipientsList: This field contains a semicolon separated list of receivers' email addresses. In an example, this is broken down to multiple rows of sender-receiver pairs which are processed independently.

(iii) CcToRecipientsList: This field contains a semicolon separated list of cc'ed receivers' email addresses. These can be processed in the same way as the ToRecipientsList.

Continuing the example of the particular case of emails, in an example the following field is extracted from the emails when generating the content nodes at 22 mentioned above:

(i) UniqueBodyContent: This field contains the body text excluding the quoted content from previous messages in the email conversation. In an example, all html tags are stripped away to leave only the text.

Moreover, in an example, a new Boolean column IsTo is created to denote if the receiver is in the To list. The rows with receivers from the ToRecipientsList have True in this column, while the ones from the CcToRecipientsList have False. The corresponding IsTo attribute may be added to the edge between the corresponding email node and the corresponding person node. It may be noted that a person can be in the To list in some emails while in the cc list for some other emails.

A similar process can be carried out for other types of "documents", including for example instant messages, calendar or meeting invitations, and conventional electronic documents, such as Microsoft Word documents, Web pages, etc. For such other types of "documents" or content a determination is also made as to who is a source or sender of the document and who is a destination or recipient of the document. For example, the contributors of a Word or other text document may in examples be considered as "senders" while pure readers may in examples be considered as "receivers". As another example, for a calendar event, the meeting organizer may in examples be considered as the "sender" and the participants as the "receivers". Required and optional participants can be distinguished by an edge attribute similar to the IsTo attribute discussed above for emails.

As part of this process, node attributes may be added to the content nodes. Such node attributes may for example relate to or be meta data concerning the content represented by the content node, including for example creation time, word count, language, etc.

Next, at 24, having generated nodes for the people and nodes for the content, edges for the graph are added from the people nodes to the content nodes where appropriate. For example, where a person is the source of some content, then an edge points in the direction from that person node to that content node. In the case that the source person is one of the people for whom a node was already generated at 20, this can be carried out immediately. In the case that the source person is not one of the people for whom a node was already generated at 20 (for example, because the person is an external user who is not part of the enterprise or organisation or is some person who has not had any contact previously with anyone in the organisation), then a person node for that person is created first, and then the directed edge is added for that person node to the respective content node.

Next, at 26, directed edges for the graph are added from the content nodes to the node(s) of the one or more people who are the destination of the respective content. As with source person nodes, if destination person is not one of the people for whom a node was already generated at 20 (for example, because the destination person is an external user who is not part of the enterprise or organisation or is some person who has not had any contact previously with anyone in the organisation), then a person node for that destination person is created first, and then the directed edge is added from the respective content node. In the case that the content node represents an email or the like, an edge attribute may be added to the corresponding edge to indicate whether the receiver of the content was in the "To" field of the email or the "Cc" field of the email. This can be used to distinguish between people to whom the email was directly sent and others who were only cc'd (copied in on the email).

Examples of further edge attributes that can be added to the respective edges include contribution amount (if available) and contributed time for authors of the content, reading time and last opened time for readers of the content, total reading time, number of times the email was opened within a period (such as for example the last 4 weeks), etc.

This is sufficient to generate the initial directional graph which represents users and content exchanged between the users. This may be carried out as a preliminary stage, prior to a search query being received and processed. To keep the initial directional graph up to date, the document nodes and the related edges may be updated when a document is added or updated or opened by a reader and when new people need to be added (as senders or authors, as receivers or readers, or both).

Figure 2:
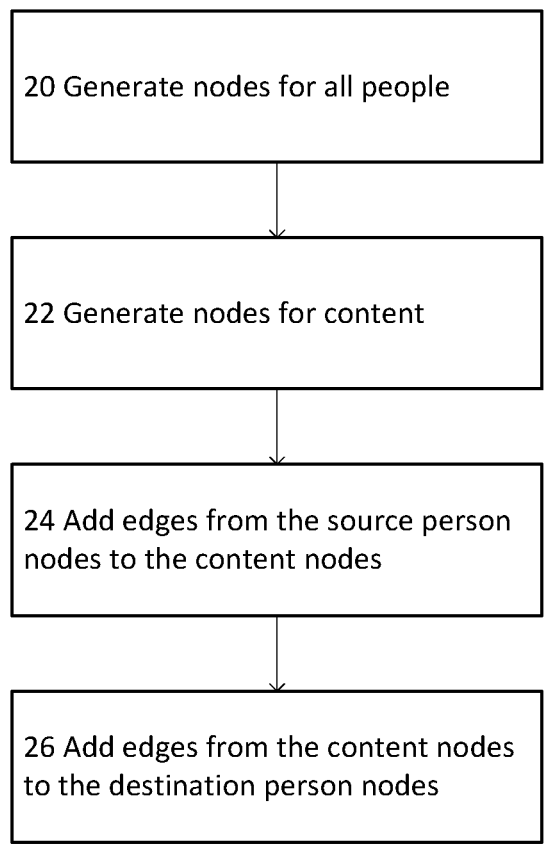
FIG. 2 shows schematically generation of an initial directional graph.

The above description with reference to FIG. 2 relates particularly to content that is "public" (such as "published" (proper) documents, such as Microsoft Word documents or the like made available in shared locations within an enterprise or organization, and Web (including for example Intranet) pages) and therefore to generation of a directional graph representing people and public content shared between people. In the case that the content is "private" (i.e., typically, personal to one or a small number of people) and therefore concerns generation of a directional graph representing people and private content shared between people, a similar process can be followed with some variations. In particular, first, at 20, a node of the private or "personal" graph is generated for each person who is a source or destination of a document (rather than creating nodes for all persons in the enterprise as for the public graph). Secondly, the documents to be traversed at 22 relate to private contents rather than public contents. Such private contents may include for example "private" (proper) documents, such as Microsoft Word documents or the like, "private" Web (including for example Intranet) pages, private emails, electronic calendar or meeting invitations, and the like. Such private contents are often saved by an enterprise (whether locally or in a "cloud-based" storage) in separate user "shards", whereas the public content is saved by the enterprise (again, whether locally or in a "cloud-based" storage) in an enterprise or "tenant" shard.

With regard to "public" and "private" contents, the following may be noted. Different definitions of what is "public" and what is "private" for present purposes may apply (though, regardless, the definition in any particular case will be clear). The precise definitions that may apply in any particular case may depend on for example the nature of the enterprise, the expectations or practices of users, employees, etc. of the enterprise, confidentiality requirements for the content, etc. One point worth noting immediately is that whilst certain documents of the enterprise may be regarded as "public" for present purposes (including for when generating graphs for the searches), this does not mean or imply that the documents are generally freely available to the general public. For example, there may be documents that are "public" in the present context because anyone in the enterprise is permitted to read them, but those documents may nevertheless be confidential to the enterprise and should not be disclosed to the general public. So, private content may be content for which there is some (specific or general) restriction on access to that content; whereas public content may be content for which there is no restriction on access to that content (at least, no restriction on access from within the enterprise, even if the content is not to be made available to the public or otherwise outside of the enterprise). As another example, an email, an instant message, a calendar or meeting invitation, etc. that is sent to one named recipient (or to a small number of named recipients, say less than 5 or 10, etc. named recipients) may be regarded as private; whereas an email, an instant message, a meeting invitation, etc. that is sent to a "group" of recipients (where the group is a collective group of a number of people, as used in for example an email distribution list as available within Microsoft Outlook or the like) or that is sent to a large number of named recipients (say more than 5 or 10, etc. named recipients) may be regarded as public.

Having created a directional graph representing people and content shared between the people (optionally creating separate directional graphs for public documents and for personal/private documents respectively as discussed above), a search for people relevant to some specific content can then be processed. As mentioned in relation to FIG. 1, at 12, a query is received and the or each directional graph is filtered 14 depending on the relevance of the contents in the graph to the query, so as to produce a "search graph" for the query, which in this case is a relevance-weighted graph.

A detailed example of this is given below with reference to FIG. 3. The main purpose of this is to reduce the size of the graph that is used to identify people and therefore make the process more suitable for use in providing results in real time in an enterprise. This is because the or each initial directional graph is likely to be (very) large and not suitable for real-time processing for each search query, at least in most computing environments which are available to organisations.

Figure 3:
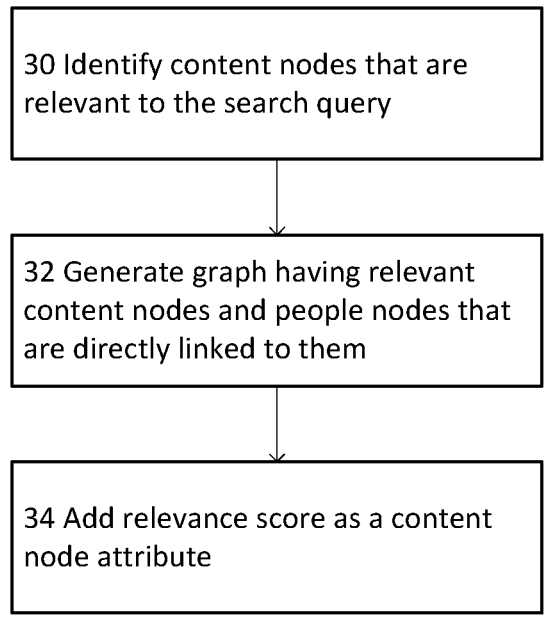
FIG. 3 shows schematically generation of a search graph from the initial directional graph.

Referring now to FIG. 3, the content nodes in the directional graph that are relevant to the search query received at 12 are identified at 30. Examples of how to determine the relevance are discussed below. Then, at 32, a graph is taken or formed in which this graph contains these relevant content nodes and the people nodes that are directly linked to them. As mentioned, this effectively filters out (removes) the content nodes relating to content that is determined not to be relevant to the search query. Then, at 34, the relevance score for the particular content represented by each content node is added, in this example being added as a node attribute of the content node.

For identifying 30 the content nodes in the directional graph that are relevant to the search query, and for obtaining a relevance score for the particular content which is to be added at 34, a number of techniques are available. Some techniques may be more useful and effective than others in different cases, depending on for example the number of people nodes and content nodes involved in the graphs. Such techniques may generically be referred to as relevance models. One example uses the term match count technique, which simply takes the query term and counts how many exact matches there are in the documents. Another example uses the TF-IDF (Term Frequency-Inverse Document Frequency) technique as described in for example "Using TF-IDF to Determine Word Relevance in Document Queries" by Juan Ramos et al. 2003, in Proceedings of the First Instructional Conference on Machine Learning, Vol. 242. Piscataway, NJ, 133-142, the entire content of which is incorporated by reference. The TF-IDF model in an example is of 2000 dimensions and pre-trained on all emails using uni-gram after removing the English stop words (that is, commonly used words (such as "the", "a", "an", "in", etc.)). Other techniques for identifying and quantifying the relevance may be used, in addition or as an alternative. An example of another technique that may be used is the BM25 ranking function.

Having applied the search query to identify the relevant content nodes and having obtained the relevance scores, the graph may be summarised using a summariser model (or "content weighting" or "aggregation" model). The summariser model may be based on for example the attributes of all the edges and content nodes that connect the two people node pair. In general, the summariser model may be relatively simple, for example one that simply sums together the relevance score of the content nodes that connect the two people node pair. Alternatively, the summariser model may use more complex techniques, such as for example using a deep neural network.

Having generated the search graph based on the query received at 12, the search graph can then be searched 18 to identify the particular people who are skilled or active in the particular area or field relating to the query. As mentioned, such people may be referred to as "influencers" for that subject matter. This stage is sometimes referred to as "graph classification" or "node classification". A number of options for this are available.

In one example, a graph classification technique is applied to each people node in the search graph. For this, in an example, those people nodes that represent people who are only readers on this subject may be ignored or skipped, as people who are only readers may be regarded as not being influencers. People nodes for people who are only readers on a subject can be identified from the fact that the directed edges for those people nodes only point to the people node and there are no edges that point away from those people nodes.

In another example, at this stage, instead of (or optionally in addition to) applying a graph classification technique to each people node in the search graph, a personal graph is generated or created for each person, as mentioned briefly above. In an example, the personal graph for each person consists of private and narrowly-shared contents this person has access to and the people related to those contents. In an example, the person who issued the search query 12 is not included in his or her personal graph or is removed from his or her personal graph when the influencers are identified, so as to avoid observation bias, which would tend to list this person as an expert in the results. When a search query arrives, the content nodes that are not relevant to the given query are dynamically filtered out and the edge and node attributes in the remaining graph are updated.

The advantages of using private/personal plus public graphs, in which in addition to the public graph a personal graph is created for each person and then analysed, include the following. The personal graphs are much smaller than using a common public graph for all users as discussed above, because it only consists of contents and people that this person has interacted with. This makes the classification quicker and more straightforward to update. Further, if and when needed, an update of a personal graph can be done locally. For example, adding a new email does not require updates to the model of everyone's graphs but only to the personal graphs of the senders and the receivers of this particular email. It may be noted that this can be leveraged for updating efficiently the changes related to public documents in the large public graph as well. Most documents have a readership that is much smaller than the whole population, so a record can be kept in the personal graph about the documents that a person has interacted with. When a change takes place, only the personal graphs of those who have interacted with the document need to be updated. New documents and new reads on documents happen very often, so this is a very useful property to have. It may be noted that often a public graph is still required because people also search for influencers that they have not interacted with before, which cannot be covered by the personal graph.

To give an idea of scale and without limitation, the initial public graph may contain hundreds or even thousands of people nodes, and each person may have sent thousands of emails and therefore there will potentially be many thousands (or tens or hundreds of thousands or more) of content nodes. There may also be thousands of combinations of sender-receiver pairs. On the other hand, of those people, only say a few tens of them may have sent emails that are relevant to the search query, and may have only sent a few tens or at most a hundred relevant emails. The personal search graphs, which are prepared for each sender or author of content in an example, may therefore only have a hundred nodes or so.

The different types of content nodes can be kept in the same (personal) graph and annotated with the node attribute. However, as another variation, a separate content graph may be generated for each type of content and then subject to a graph classification technique based on the search query. In such a case, results from analysing the content graph(s) may be used to identify relevant people, either in addition to or instead of using the personal graphs.

Figure 4:
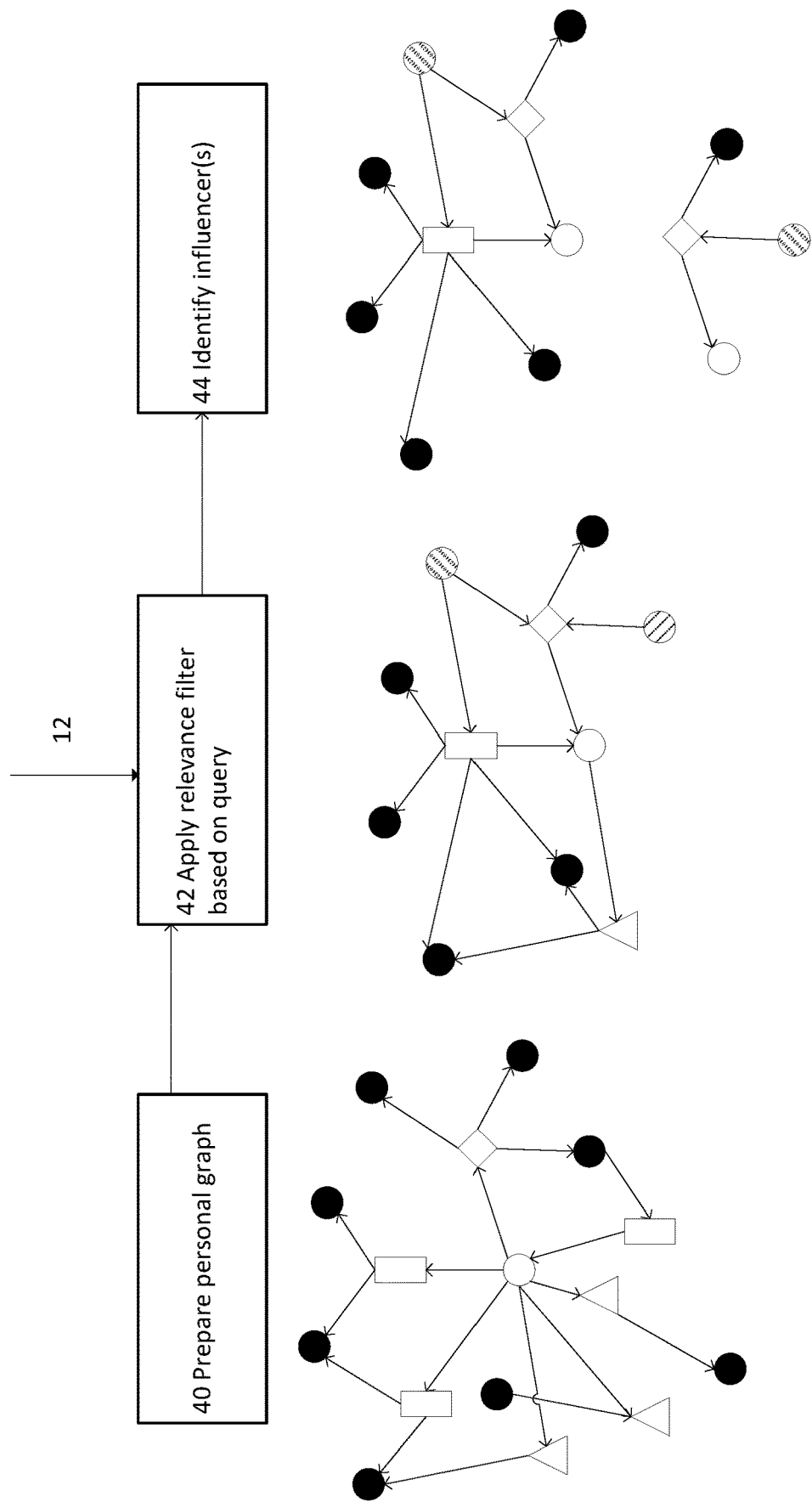
FIG. 4 shows schematically the flow involved in generation of a personal graph and also the corresponding graph at each stage.

FIG. 4 shows schematically the flow involved in generation of a private/personal graph and also examples of the corresponding graph produced at each stage. In the graphs, the empty circle is the node that represents the person making the search query; the filled circles are the nodes that represent other people; rectangles are the nodes that represent (proper) documents, like Microsoft Word documents, etc., triangles are the nodes that represent Web (including for example Intranet) pages, etc.; diamonds are the nodes that represent emails or meeting invitations. Again it is to be understood that the graphs are shown highly schematically and that, in practice, there may be many more people nodes and content nodes than shown in this simplified example.

At 40, the personal graph is prepared. As can be seen by the graph below box 40, this includes the person who issued the search query, other people, and the various forms of content shared between the people. At 42, the search query is received, and a relevance filter is applied. This causes those content nodes that are not relevant to be removed from the graph, as seen in the graph shown below box 42. Then at 44, the "influencers", that is, the people who are skilled or active in a particular area or field, are identified, in an example by applying a graph classification technique. As can be seen in the graph below box 44, this leaves a smaller number of people, who can then be recommended to the person who issued the search query. Further as can be seen, the person who issued the search query has also been removed from the graph so as to avoid observation bias, which, as mentioned above, would tend to identify this person as an expert in the results. (In the graph below box 44, the nodes for two "influencers" who have been identified are shown with cross-hatching. The location of the same two nodes in the graph below box 42 is indicated with the same cross-hatching, even though, at that point in the process, the "influencers" have not yet been identified.)

In the graphs discussed above, people are represented by nodes and the content shared between the people is also represented by nodes. Attributes applied to the edges can be used to represent inter alia the importance of the content to the related people, based on for example reading time, most recent editing time, etc. This means that the nodes are heterogenous, that is of mixed or different types. This may require adaptation of some known graph classification techniques. As an alternative, the graphs may be formed so that nodes only represent people and the content shared between the people is represented by the edges. Such graphs, including for example the initial large directional graph generated for all users but particularly the one or more of the search graphs discussed above, may be formed immediately in this way. For example, all content nodes connecting two person nodes to a set of features (e.g., key topics) may be aggregated and the people-only graph generated with those features in the edge attributes. As an alternative, such graphs may be generated by first forming the graphs as discussed above (with people nodes and content nodes) and then using a summariser model ("content weighting" or "aggregation" model) to convert the people-content-people graph to a people-people graph. Either way, this avoids having to deal with heterogeneous nodes as the nodes in this example only represent people. The model can take content node attributes such as query relevance score, length, reader dwelling time, author contribution score, etc. as features. This can be a simple heuristic model or can be trained with interaction signals such as sharing, commenting or reading again. (Here, it is assumed that if someone is influenced by a document they will share it with others, leave a comment or read more similar documents in the near future.)

Figure 5:
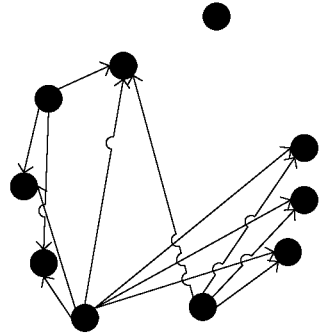
FIG. 5 shows schematically an example of the formation and use of a sub-graph.
Figure 5:
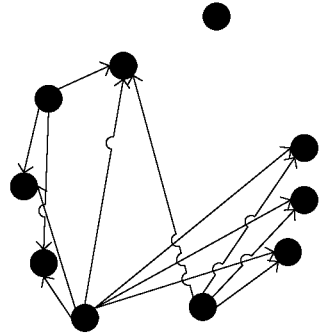
Figure 5:
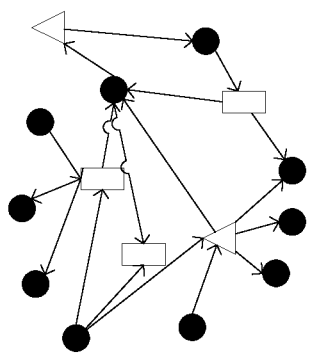
Figure 5:
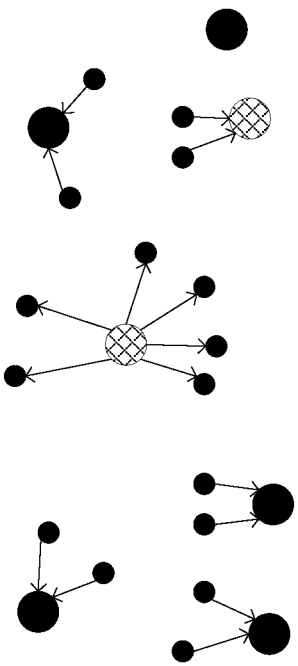
Figure 5:
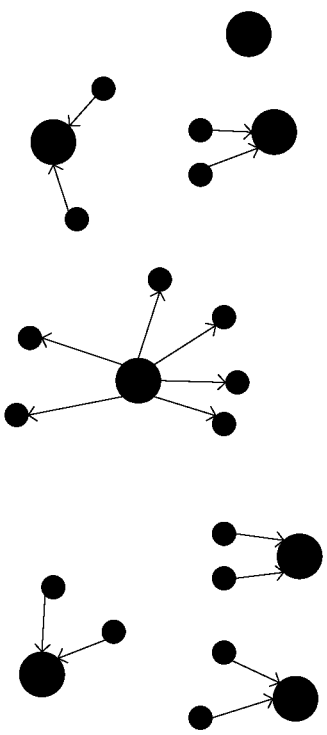

An alternative to classifying each node based on the overall graph (whether a single directional graph that is initially used in some examples, or one or both of the separate public graph and private/personal graph that is/are initially used in some examples) is to use only the sub-graph of a people node, e.g. only consider its neighbours. That is, this example takes a people node and its sub-graph which only keeps its authored content and the readers of those contents. In this way in accordance with this example, the node classification problem in a large graph is actually converted to a graph classification problem done on a much smaller sub-graph. In the case of a single directional graph that is initially used in some examples or a public graph that is initially used in some examples, this may be carried out for each people node, so that instead of classifying N nodes in a large graph, N small graphs are taken around each person node and the N graphs are classified. Either way, whether for a single directional graph, a public graph or a private/personal graph, having obtained sub-graphs for the or each person, a graph classification technique is applied to the or each person's sub-graph to determine if that person can be regarded as an influencer. FIG. 5 shows schematically an example of the formation and use of such a sub-graph. In an example, this is carried out immediately before the influencers are identified (at 44 in FIG. 4 discussed above, which in an example uses a graph classification technique). A number of the stages shown schematically in FIG. 5 are the same as or similar to stages shown schematically in FIG. 1 discussed in detail above and a detailed description of those stages and options for those stages is not repeated here.

Referring to FIG. 5, at 50 (like item 10 in FIG. 1) a directional graph representing people and content shared between people is created. At 52 (like items 12 and 14 in FIG. 1), a search query is received and the graph is filtered depending on the relevance of the contents in the graph to the query.

Next, in the example shown in FIG. 5, a content summariser model (discussed in more detail above) is applied so that a graph having only people nodes is produced at 54. As noted above, whilst useful and convenient in many cases as it reduces the complexity of the graph classification that is required, this is an optional stage. Further, not using the content summariser model may lead to results that are more accurate or relevant for the searcher, as having separate people nodes and content nodes enables more pertinent results to be achieved. For example, someone may send 10 emails, each to one person. In another case, someone may send one email to 10 people. The two might look very similar if the content summarizer is used ("this person reaches 10 people"), but the latter case is probably more influential and would appear as such if the content summarizer is not used.

Next, the graph is converted to a per person sub-graph by considering only the neighbourhoods of the person nodes. In particular, in the case that a content summariser model is used at 54, it is only necessary to consider one level of neighbours (at those neighbours are all person nodes). This is illustrated schematically at 56 in FIG. 5, with large circles representing the person node being considered and small circles representing the neighbour person nodes. Alternatively, if a content summariser model is not used and there are both person nodes and content nodes in the graph, then it is necessary to consider two levels of neighbours (through to a document node and then on to the person node(s) connected to that document node).

Finally, at 58, the influencers are identified (similarly to 44 in FIG. 4 discussed above, which in an example uses a graph classification technique). The identified influencers are indicated in FIG. 5 with cross-hatched circles.

Particular advantages of the above example, in which a sub-graph is created for each person and then analysed, include the following. The sub-graphs are much smaller than the search graph discussed above, which makes the classification of each sub-graph quicker. Further, the typical structure of the sub-graph of an influencer is generic regardless what the subject matter is and which tenant the person belongs too. Significantly, this example also makes it possible to train the sub-graph classification method with public data which are much larger than per-tenant data and with less restricted compliance requirements on data access. This makes the model training process much more straightforward and quicker to carry out.

For the graph classification technique, which is used as described above to identify or extract the important "influencer" nodes from one or other of the relevance-weighted graphs, a number of options are available.

One example is based on the PageRank technique, described at for example at "The PageRank Citation Ranking: Bringing Order to the Web", Technical Report, Stanford InfoLab, by Lawrence Page, Sergey Brin, Rajeev Motwani, and Terry Winograd 1999, the entire content of which is incorporated herein by reference. Similar to the idea that a Web page with many incoming links is regarded as influential, a people node with for example many incoming emails is regarded as influential. The reverse direction of the edges, that is a node with many outgoing emails, may alternatively or additionally be considered to be an indication that the people node is influential. A problem with that is that, in many instances, the mailbox owner shows up in most of the emails as an "influencer". This is understandable since the owner's email appears in almost every email (typically only not appearing in emails that arrived via an email distribution list). This alternative may therefore be useful in some circumstances but not others.

Another example is based on the "HITS" (Hyperlink-Induced Topic Search) technique, described at for example "The Web as a graph—measurements, models, and methods" by Jon M Kleinberg, Ravi Kumar, Prabhakar Raghavan, Sridhar Rajagopalan, and Andrew S Tomkins, 1999, in International Computing and Combinatorics Conference, Springer, 1-17, the entire content of which is incorporated by reference. This technique extracts both "hubs" (node with many outgoing edges) and "authorities" (nodes with many incoming edges) from the graph. In principle, both hubs and authorities can be considered as influencers. However, at least in the present case using emails as an example, it has been found that hubs work significantly better based on a rough manual evaluation mainly because it solves the issue that the mailbox owner shows up too often.

Another example of a graph classification technique which may be used is based on a "graph neural network". This is a type of neural network which operates directly on the graph structure and can be used for node classification. The paper "A Comprehensive Survey on Graph Neural Networks" by Zonghan Wu, Shirui Pan, Fengwen Chen, Guodong Long, Chengqi Zhang, and Philip S. Yu, 2019, available at https://arxiv.org/abs/1901.00596, the entire content of which is incorporated herein by reference, discusses a number of examples of graph neural networks. This can be particularly suitable if there is enough training data to train the graph neural network classifier directly to predict each person's influencer score on the query topic. In this regard it may be noted that the classifier trained from one company's data may not perform well with data from a different company of different size and culture. It is not realistic to require each company to provide sufficient data and train a separate classifier for them. To solve this, unsupervised clustering may first be used to abstract several typical structures from each company's own data, and then the structures are classified with their distance to the known influencer structure or transfer learning is used to match the abstracted structures to the known structures. For this, graph convolutional network (GCN) combined with graph auto-encoder (GAE) may be used.

Compared to traditional graph analysis methods like PageRank and HITS mentioned above, GNN is able to describe and understand more nuance in the graph structure and therefore obtain better classification accuracy with the potential of detecting more detailed influencer types too.

Other graph classification techniques may be used, including for example "GraphSAGE", "DeepWalk", matrix decomposition, direct product kernel, etc.

In the examples described above, it was described that the generation and classification, etc. of the graphs may be carried out effectively jointly for content that is deemed to be public and content that is deemed to be private, with both public and private content being represented in the original directional graph and the search graph(s), and so provide search results relating to public and private content immediately. In such a case, the graphs will be saved in each user shard in the way of public+this user's private graph. This results effectively in the public part being duplicated many times, in the respective user shards. In this regard, it is noted that the part of the graphs relating to public content will be (very) large. Therefore, especially if there is a large number of users and/or large amounts of content, this may not be an efficient use of data storage. Accordingly, and as briefly mentioned above, graphs may be generated and classified, etc., separately for public content and for private content. In such a case, the public and private graphs may be stored separately, with for example the public graph being saved in a tenant shard and the private graphs in each respective user shard. The updating and processing of the graphs can be done independently on the public graph and each of the user graphs, and the results merged at the end using an ensemble model (for example, using a weighted average of public and private results based on a confidence score).

Another advantage of dealing with the public contents and the private contents separately and independently is that it helps prevent private information leaking from the private contents into the public domain (in the sense of leaking to the person who initiated the search and who may not have access to the private content of the other people).

Further on privacy, in an example, users are provided with an option to set access permissions for their content so as to allow or deny access to the content when graphs are being generated as described herein.

In summary, examples described herein enable a person to search for other people who are likely to be familiar with or even an expert in certain topics of interest to the person. Because content data is also used in the graphs, the examples can handle not only people queries, based on for example name or title or the like, but also queries in relation to an area of expertise, certain specific projects, etc. By combining private graphs (using for example content from emails and meetings) with a tenant- or enterprise-wide "public" graph, examples can handle both people who are known to the person carrying out the search and people who are not known to the person carrying out the search (and yet who may have some connection to the person carrying out the search, because for example they are in the same enterprise and/or have some connection to a person who is known to the person carrying out the search). Such a search is carried out dynamically in that the search graph is generated in response to the search query being received and then the search results are generated. The search is also personalised in that it favours finding people who are (somehow) known or connected to the user. Also, the search is contextualised in that it not only looks for people who are known to the user but also looks for such people who have an interest or, in particular, are experts in the topic of interest to the user.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An apparatus comprising a processing system constructed and arranged to carry out a method of generating search results relating to a search for people, the method comprising:
receiving from the user a search query, the search query relating to a search for people and including one or more search terms;
in response to receiving the search query, generating a search graph for the search for people related to the topic of interest to the user,
wherein the search graph is generated from a previously created graph,
wherein the previously created graph is a directional graph representing people and content shared between people,
the previously created graph comprising nodes and edges between the nodes, with people being represented by nodes of the graph and with content being represented by nodes of the graph, the direction of the edges of the graph indicating whether a person is a source or a destination of the corresponding content, and
wherein generating the search graph comprises:
filtering out nodes or edges of the previously created graph that represent content that is determined not to be relevant to the one or more search terms in the search query, and
for the remaining content that is determined to be relevant to the one or more search terms in the search query, adding to the graph a measure of the relevance of the content to the one or more search terms in the search query; and
identifying people in the search graph who are sources of content that is relevant to the one or more search terms in the search query.

2. The apparatus according to claim 1, wherein the method is carried out jointly for content that is public content and content that is private content.

3. The apparatus according to claim 1, wherein the method is carried out separately for content that is public content and for content that is private content, wherein generating the search results comprises combining the results of operating on the search graphs for the public content and the private content.

4. The apparatus according to claim 1, wherein a private search graph of each person does not include a node representing that person.

5. The apparatus according to claim 1, wherein the edges from a person node to a content node indicate that the person sent the content, and edges from a content node to a person node indicate that the person received the content.

6. A computer program embodied on a non-transitory computer-readable storage medium comprising instructions such that when the computer program is executed on one or more computing devices, the one or more computing devices are arranged to carry out a method of generating search results relating to a search for people, the method comprising the one or more computing devices:
receiving from the user a search query, the search query relating to a search for people and including one or more search terms;
in response to receiving the search query, generating a search graph for the search for people related to the topic of interest to the user,
wherein the search graph is generated from a previously created graph,
wherein the previously created graph is a directional graph representing people and content shared between people,
the previously created graph comprising nodes and edges between the nodes, with people being represented by nodes of the graph and with content being represented by nodes of the graph, the direction of the edges of the graph indicating whether a person is a source or a destination of the corresponding content, and
wherein generating the search graph comprises:
filtering out nodes or edges of the previously created graph that represent content that is determined not to be relevant to the one or more search terms in the search query, and
for the remaining content that is determined to be relevant to the one or more search terms in the search query, adding to the graph a measure of the relevance of the content to the one or more search terms in the search query; and
identifying people in the search graph who are sources of content that is relevant, to the one or more search terms in the search query.

7. The computer program according to claim 6, wherein the method is carried out jointly for content that is public content and content that is private content.

8. The computer program according to claim 6, wherein the method is carried out separately for content that is public content and for content that is private content, wherein generating the search results comprises combining the results of operating on the search graphs for the public content and the private content.

9. The computer program according to claim 6, wherein a private search graph of each person does not include a node representing that person.

10. The computer program according to claim 6, wherein the edges from a person node to a content node indicate that the person sent the content, and edges from a content node to a person node indicate that the person received the content.

11. A method carded out by a computing device to search for people related to a topic of interest to a user, the method comprising the computing device:
receiving from the user a search query, the search query relating to a search for people and including one or more search terms;
in response to receiving the search query, generating a search graph for the search for people related to the topic of interest to the user,
wherein the search graph is generated from a previously created graph,
wherein the previously created graph is a directional graph representing people and content shared between people,
the previously created graph comprising nodes and edges between the nodes, with people being represented by nodes of the graph and with content being represented by nodes of the graph, the direction of the edges of the graph indicating whether a person is a source or a destination of the corresponding content, and
wherein generating the search graph comprises:
filtering out nodes or edges of the previously created graph that represent content that is determined not to be relevant to the one or more search terms in the search and, for the remaining content that is determined to be relevant to the one or more search terms in the search query, adding to the graph a measure of the relevance of the content to the one or more search terms in the search query; and identifying people in the search graph who are sources of content that is relevant to the one or more search terms in the search query.

12. The method according to claim 11, wherein the method is carried out jointly for content that is public content and content that is private content.

13. The method according to claim 12, wherein a private search graph of each person does not include a node representing that person.

14. The method according to claim 11, wherein the method is carried out separately for content that is public content and for content that is private content, and wherein search graphs for the public content and search graphs for the private content identify at least some of the same people.

15. The method according to claim 11, wherein the edges from a person node to a content node indicate that the person sent the content, and edges from a content node to a person node indicate that the person received the content.

16. The method according to claim 11, wherein operating on the search graph to identify people in the search graph who are sources of content that is relevant to the one or more search terms in the search query comprises applying a graph classification technique to each people node in the search graph.

17. The method according to claim 11, comprising generating a neighbourhood graph for each person, in which the graph for each person comprises only contents that are produced by that user and people who are readers or recipients of those contents.

18. The method according to claim 17, wherein for each person's sub-graph, person nodes are classified based on only any immediate neighbour person nodes without utilizing information from any more remote person nodes.

19. The method according to claim 18, wherein the person nodes are classified with a graph classifier which is trained with external data.

20. The method according to claim 11, wherein the relevance of content to the one or more search terms in the search query is determined by applying a relevance model to the search graph.

* * * * *